United States Patent
Miller (10) Patent No.: US 11,110,812 B2
(45) Date of Patent: Sep. 7, 2021

(54) MOBILE CHARGING FOR ELECTRIC VEHICLES

(71) Applicant: Ford Global Technologies, LLC, Dearborn, MI (US)

(72) Inventor: Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 16/306,105

(22) PCT Filed: May 31, 2016

(86) PCT No.: PCT/US2016/035038
§ 371 (c)(1),
(2) Date: Nov. 30, 2018

(87) PCT Pub. No.: WO2017/209735
PCT Pub. Date: Dec. 7, 2017

(65) Prior Publication Data
US 2019/0135133 A1 May 9, 2019

(51) Int. Cl.
| | |
|---|---|
| *B60L 53/30* | (2019.01) |
| *B60L 53/14* | (2019.01) |
| *B60L 53/126* | (2019.01) |
| *B60L 53/34* | (2019.01) |
| *B60L 53/16* | (2019.01) |
| *B60L 9/00* | (2019.01) |

(52) U.S. Cl.
CPC .......... *B60L 53/305* (2019.02); *B60L 53/126* (2019.02); *B60L 53/14* (2019.02); *B60L 53/16* (2019.02); *B60L 53/34* (2019.02); *B60L 9/00* (2013.01); *B60L 2240/62* (2013.01); *B60L 2260/32* (2013.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01)

(58) Field of Classification Search
CPC ........ B60L 53/34; B60L 53/305; B60L 53/14; B60L 53/126; B60L 53/16
USPC ................................. 320/108, 109
See application file for complete search history.

(56) References Cited

U.S. PATENT DOCUMENTS

| | | | | |
|---|---|---|---|---|
| 9,493,087 | B2 * | 11/2016 | Leary | B60L 15/20 |
| 9,527,394 | B1 * | 12/2016 | Tang | B60W 10/26 |
| 9,533,587 | B2 * | 1/2017 | Krammer | B60L 53/36 |
| 9,630,516 | B2 * | 4/2017 | Enomoto | B60L 53/126 |
| 9,744,870 | B2 * | 8/2017 | Cronie | B60L 11/182 |
| 10,011,181 | B2 * | 7/2018 | Dudar | B60L 53/39 |
| 10,108,202 | B1 * | 10/2018 | Aikin | B60L 15/42 |
| 10,532,663 | B2 * | 1/2020 | Ricci | B60L 53/65 |

(Continued)

*Primary Examiner* — Richard V Muralidar
(74) *Attorney, Agent, or Firm* — Brandon Hicks; Eversheds Sutherland (US) LLP (57) ABSTRACT

Example methods, apparatus and articles of manufacture for mobile charging of an electric vehicle are described herein. An example electric vehicle includes a battery and a first charge interface for the battery disposed on an exterior surface of the electric vehicle. The first charge interface is configured to be engaged with a second charge interface on an articulating arm of a mobile charge vehicle to transfer energy from an energy source of the mobile charge vehicle to the battery while the electric vehicle is in motion.

17 Claims, 6 Drawing Sheets

(56) References Cited

U.S. PATENT DOCUMENTS

2010/0201309 A1* 8/2010 Meek .................. B60L 53/14
320/108
2017/0136881 A1* 5/2017 Ricci .................. H02J 7/025
2020/0317067 A1* 10/2020 Miller ................. B60L 53/126

* cited by examiner

MOBILE CHARGING FOR ELECTRIC VEHICLES

FIELD OF THE DISCLOSURE

This disclosure relates generally to electric vehicles and, more particularly, to mobile charging for electric vehicles.

BACKGROUND

Electric vehicles, including fully electric vehicles and hybrid electric vehicles, employ one or more batteries to store electrical power. These batteries are typically large to ensure an adequate driving range. Such large batteries are not only expensive to produce but add significant weight to the vehicle.

SUMMARY

An example electric vehicle disclosed herein includes a battery and a first charge interface for the battery disposed on an exterior surface of the electric vehicle. The first charge interface is configured to be engaged with a second charge interface on an articulating arm of a mobile charge vehicle to transfer energy from an energy source of the mobile charge vehicle to the battery while the electric vehicle is in motion.

A mobile charge vehicle is disclosed herein for charging an electric vehicle having a battery and a first charge interface. The mobile charge vehicle includes an energy supply, an articulating arm, a second charge interface coupled to an end of the articulating arm, and a controller to move the articulating arm to engage the second charge interface with the first charge interface while the mobile charge vehicle is moving.

An example apparatus disclosed herein includes a first vehicle having a first charge interface disposed in a recess formed in an exterior surface of the first vehicle and a second vehicle having an articulating arm. A second charge interface is carried on an end of the articulating arm. The articulating arm is to extend the second charge interface to engage the first charge interface while the first and second vehicles are moving.

An example method disclosed herein includes determining whether a mobile charge vehicle is within a target distance from an electric vehicle, switching the electric vehicle into an autonomous driving mode when the mobile charge vehicle is determined to be within the target distance, and receiving energy from the mobile charge vehicle to charge a battery of the electric vehicle.

An electric vehicle disclosed herein includes a battery, a charge interface for the battery disposed on an exterior surface of the electric vehicle, and a charge monitoring system. The charge monitoring system is to determine when a mobile charge vehicle is within a first target distance from the electric vehicle and switch the electric vehicle into an autonomous driving mode when the mobile charge vehicle is determined to be within the first target distance.

An example method disclosed herein includes detecting when a mobile charge vehicle is within a first target distance from an electric vehicle, switching the electric vehicle into an autonomous driving mode when the mobile charge vehicle is detected as being within the first target distance and controlling the electric vehicle to reduce a distance between the mobile charge vehicle and the electric vehicle to a second target distance smaller than the first target distance.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

Electric vehicles (EVs) are becoming more prevalent. In fact, many countries are considering certain restrictions on gas vehicles, thereby increasing the demand for EVs. An EV may be a full EV, which operates entirely on electricity, or a hybrid EV, which includes two power sources: one powered by electricity and one powered by gas or some other fuel. Both full EVs and hybrid EVs employ a battery to store energy that is used to power a motor of the EV. When buying an EV, consumers typically desire the battery to contain much more power than needed to drive to a destination (e.g., work) and back (e.g., back home) in case the consumer has to make additional stops or trips. For example, many consumers desire a battery that has 2 to 3 times more battery capacity than is typically needed. For instance, a consumer that travels 50 miles to and from work will typically desire a vehicle having a charge range of at least 100-150 miles, and as much as 300 miles. As a result, EVs are manufactured with relatively large batteries to meet the consumers' demands. Not only are these large batteries expensive, but they add significant weight to the vehicle and, thus, decrease the efficiency of the vehicle. The added weight also means a more rigid chassis is needed to support the battery, which further increases manufacturing costs.

Example methods, apparatus and articles of manufacture are disclosed herein for recharging a battery of an EV (a full EV or a hybrid EV). In some examples, charging may occur while the EV is in motion, which enables the EV to be charged between stops and more often and, thus, decreases the need for a larger battery. As a result, the EV can employ a battery having a relatively smaller capacity and, thus, smaller sized batteries can be utilized. Smaller batteries are relatively lighter and cheaper to manufacture. Therefore, the disclosed methods, apparatus and articles of manufacture reduce costs and increase fuel economy of an EV. Further, the example methods, apparatus and articles of manufacture disclosed herein enable drivers to be more confident in their driving ranges because a mobile charge operation can be performed while the EV is en route and with minimal interference to the EV.

In some disclosed examples, one or more mobile charge vehicles or units (MCVs) are stationed, or in motion, throughout an area, such as a city or town. If the remaining energy or charge of the battery of an EV becomes low (i.e., a charge is needed), a mobile charge operation can be requested (e.g., manually or automatically). One of the MCVs is scheduled to rendezvous with the EV at a rendezvous location (e.g., along a section of a highway). The EV includes a first charge interface for the battery that is accessible from an exterior of the EV. In particular, the first charge interface is disposed on an exterior surface of the EV (e.g., on a rear bumper of the EV). As used herein, "on an exterior surface" or "on an exterior" means on an outer most surface (e.g., flush with or protruding from the outer most surface) of a vehicle, in a recess formed in an outer most surface of a vehicle, or behind a protective cover such as a door that opens or a rubber seal that can be penetrated. Example MCVs include an articulating arm carrying a second charge interface for a battery or other source of electrical energy supply carried by the MCV. When the MCV is positioned within a target distance from the EV, the articulating arm is extended to engage the second charge interface with the first charge interface. In some examples, the engagement between the charge interfaces is a direct connection. For example, the second charge interface on the mobile charge vehicle may be a male pin connector and the first charge interface on the EV may be a female socket connector. In other examples, the first and second charge interfaces may include inductive plates for wireless charging or charging that does not require a fixed physical contact between the charge interfaces.

In some examples, the mobile charge vehicle includes an alignment sensor to align the second charge interface on the mobile charge vehicle with the first charge interface on the EV. In some examples, the alignment sensor is carried on the end of the arm (e.g., adjacent the second charge interface). The alignment sensor may be one or more of camera, a laser, an acoustic sensor (e.g., a sonic or ultrasound sensor), for example. In other examples, other types of alignment sensors may be employed. For example, a detection/alignment system may be employed that includes a sender (e.g., an infrared light) and a receiver (e.g., an infrared sensor).

In some examples, during deployment of the arm and/or during charging, the EV switches into autonomous driving mode in which the EV is self-driven. In some instances, having the EV in an autonomous driving mode ensures that the EV is driven with consideration of the MCV driving adjacent (e.g., behind) the EV. For example, the EV may be driven more cautiously to account for braking distance and/or other road and traffic conditions. In some examples, the MCV is autonomous or self-driving. In some examples, the EV and the MCV communicate driving information (e.g., a speed, a direction, a quantity of braking or accelerating, a road condition(s), a traffic condition(s), etc.) to each other to synchronize the driving of both vehicles. As such, the EV and/or the MCV may adjust their driving according to the other to maintain the vehicles within a target distance (e.g., a desired range) while the charging takes place. Once the charge is complete or a desired charge amount is reached, the arm may be retracted and the EV may continue to its desired destination.

Figure 1:
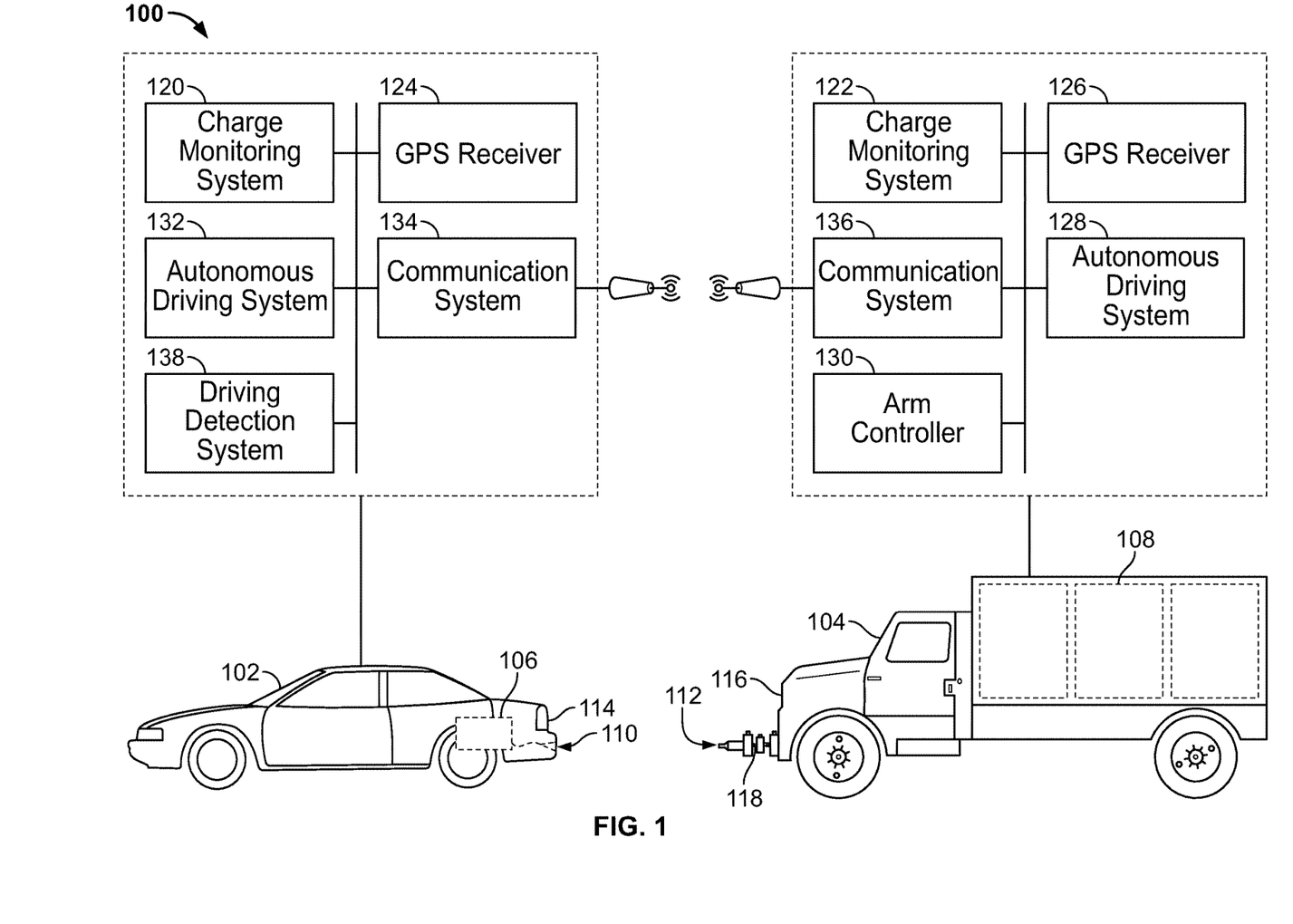
FIG. 1 illustrates an example system including an electric vehicle and an example mobile charge vehicle for charging a battery of the electric vehicle.

An example system 100 for charging an electric vehicle (EV) 102 (e.g., a first vehicle) with a mobile charge vehicle (MCV) 104 (e.g., a second vehicle) is illustrated in FIG. 1. The EV 102 may be any vehicle (e.g., an automobile) powered at least in part by a battery or another source of stored energy (e.g., a capacitor). The electric vehicle 102 may be a full EV (e.g., powered entirely by electricity) or a hybrid EV (e.g., powered in part by a gas or fuel and in part by electricity).

In the illustrated example, the EV 102 includes a battery 106 (e.g., a first battery). The battery 106 may be one battery or multiple batteries that provide electrical power to a motor of the EV 102. The MCV 104 includes a battery 108 (e.g., a second battery, an energy supply) that may include one or more batteries. In some examples, the battery 108 of the MCV 104 is pre-charged. Additionally or alternatively, in some examples, the MCV 104 charges the battery 108 with the engine of the MCV 104 (e.g., via an alternator) and/or another engine (e.g., a generator) carried by the MCV 104. The MCV 104 may be a full EV, a hybrid EV, a gas powered vehicle, a fuel cell vehicle, or any other type of vehicle having an energy supply.

To transfer energy from the battery 108 of the MCV 104 to the battery 106 of the EV 102, the EV 102 includes a first charge interface 110 for the battery 106 and the MCV 104 includes a second charge interface 112 for the battery 108. When the first charge interface 110 and the second charge interface 112 are engaged (e.g., coupled or in close proximity), energy can be transferred from the battery 108 of the MCV 104 to the battery 106 of the EV 102. In other words, the first charge interface 110 is configured to be engaged with the second charge interface 112 to transfer electrical energy from the battery 108 of the MCV 104 to the battery 106 of the EV 102. For example, the first charge interface 110 may be a female connector and the second charge interface 112 may be a male connector, or vice versa.

The first charge interface 110 is to be disposed on an exterior surface of the EV 102. In the illustrated example, the first charge interface 110 is located on a rear 114 of the EV 102 (e.g., on a rear bumper, beneath the rear bumper, etc.). The second charge interface 112 is located on a front 116 of the MCV 104 (e.g., on a front bumper, beneath or above the front bumper, etc.). In particular, the second charge interface 112 is carried on an end of an articulating arm 118 that is movably coupled to the front 116 of the MCV 104. The arm 118 is controlled to move the second charge interface 112 outward and to engage the second charge interface 112 with the first charge interface 110, as disclosed in further detail herein.

In the illustrated example, the EV 102 includes a charge monitoring system 120 that monitors the level of energy or charge remaining in the battery 106. In some examples, the charge monitoring system 120 automatically requests a charge from an MCV (e.g., the MCV 104) when the remaining energy in the battery 106 reaches a threshold (e.g., 10% capacity). Additionally or alternatively, in some examples a user (e.g., the driver of the EV 102) requests a charge from an MCV.

In some examples, the system 100 operates in a plurality of modes or phases throughout a charging process. For example, the charge monitoring system 120 of the EV 102 and a charge monitoring system 122 of the MCV 104 may operate the respective vehicles in different modes. Once a charge is requested, the system 100 coordinates a rendezvous between an MCV, such as the MCV 104, and the EV 102. In some examples, multiple MCVs are stationed through an area (e.g., a city). In some examples, the MCVs are stationed at charge stations and are charging their respective batteries. In a rendezvous mode (e.g., a first mode), the charge monitoring system 122 of the selected MCV 104 navigates the MCV 104 to a rendezvous location and approaches the EV 102. Example methods, apparatus and articles of manufacture that may be implemented to coordinate a rendezvous between an MCV and an EV are disclosed in International Patent Application No. PCT/US16/34103, titled "Methods and Apparatus to Charge Electric Vehicles," filed May 25, 2016, which is incorporated herein by reference in its entirety.

In the illustrated example, the EV 102 includes a global positioning system (GPS) receiver 124 and the MCV 104 includes a GPS receiver 126. A rendezvous location may be determined based on the locations of the EV 102 and the MCV 104. In some examples, the rendezvous location is a range. For example, the rendezvous location may be a quarter mile section of a highway where the MCV 104 is scheduled to meet the EV 102. In some examples, the MCV 104 is autonomously driven. The MCV 104 includes an autonomous driving system 128 that automatically drives the MCV 104 to the rendezvous location. The rendezvous location may be constantly updated based on changes in the location and/or anticipated location of the EV 102 and/or the MCV 104. As such, the EV 102 can continue to its desired location without interruption. In other examples, the MCV 104 is human driven.

The MCV 104 drives to the rendezvous location and approaches the rear 114 of the EV 102 until the MCV 104 is within a target distance from the EV 102. Once the MCV 104 is within a target distance of the EV 102, the system 100 operates in a deployment mode (e.g., a second mode) in which the arm 118 is deployed to engage the second charge interface 112 with the first charge interface 110. In some examples, the charge monitoring system 120 and/or the charge monitoring system 122 determines whether the MCV 104 is within the target distance based on the relative locations of the EV 102 and the MCV 104 determined by the GPS receivers 124, 126. In some examples, vehicle object detection sensors such as radar, ultrasound, camera, etc. may be used to determine the relative locations of the EV 102 and the MCV 104. Additionally or alternatively, alignment information from an alignment sensor (e.g., such as the alignment sensor 322 of FIG. 3) may be used to determine whether the MCV 104 is within the target distance from the EV 102.

In some examples, the target distance is based on one or more of the size of the EV 102, the size of the MCV 104, the speed of the EV 102, the speed of the MCV 104, the reachable distance of the arm 118, road conditions (e.g., potholes, icy roads, etc.), traffic conditions, etc. In some examples, the target distance is a range. For example, the target distance may be an area in which a center of the front 116 of the MCV 104 is intended to remain, such as within a distance of 3'-6' behind the middle of the rear 114 of the EV 102, and within 2' to either side of a middle of the rear 114 of the EV 102. In other examples, the target distance may be other ranges. Within this range, the arm 118 can operate to engage the second charge interface 112 with the first charge interface 110 for charging (as disclosed in further detail herein). In the illustrated example, the MCV 104 includes an arm controller 130 to control the arm 118 to engage the second charge interface 112 with the first charge interface 110.

Once the second charge interface 112 is engaged with the first charge interface 110, the system 100 operates in a charge mode (e.g., a third mode). For example, the charge monitoring system 120 of the EV 102 and the charge monitoring system 122 of the MCV 104 switch to a charge mode and energy is transferred from the battery 108 of the MCV to the battery 106 of the EV 102. In some examples, during the deployment mode and/or the charge mode, the EV 102 and/or the MCV 104 are switched to an autonomous driving mode (e.g., a self-driving mode). For instance, once the MCV 104 is within the target distance, the charge monitoring system 120 of the EV 102 may switch the EV 102 into an autonomous driving mode. Additionally or alternatively, the charge monitoring system 122 of the MCV 104 may switch to the MCV 104 into an autonomous driving mode. In the illustrated example, the EV 102 includes an autonomous driving system 132 that operates to automatically drive the EV 102. The autonomous driving system 132 drives the EV 102 based on the consideration that the MCV 102 is adjacent (e.g., behind) the EV 102. For example, the autonomous driving system 132 may drive the EV 102 at a relatively slower speed, take wider turns, allow for more room between the EV 102 and vehicles ahead (e.g., to enable the EV 102 to accelerate and decelerate at lower rates), etc. In some examples, the autonomous driving system 132 may consider road conditions (e.g., potholes, icy roads, etc.) and/or traffic conditions.

In some examples, after switching the EV 102 into an autonomous driving mode, the EV 102 is controlled to reduce a distance between the MCV 104 and the EV 102 to a second target distance, which is closer than the initial target distance. For example, the MCV 104 may drive to the rendezvous location and approach the rear 114 of the EV 102 until the MCV 104 is within a first target distance. The first target distance may be, for example, a range of 10'-20'. When the MCV 104 is within first target distance from the EV 102, the charge monitoring system 120 of the EV 102 switches the EV 102 into an autonomous driving mode. The EV 102 and/or the MCV 104 are then autonomously controlled (e.g., via the respective autonomous driving systems 132, 128) to reduce a distance between the EV 102 and the MCV 104 to a second target distance, which is smaller than the first target distance. For example, the second target distance may be 3'-6'. The EV 102 may reduce its speed, for example. Additionally or alternatively, the EV 102 may send driving instructions (e.g., via the communications system 134 (FIG. 1)) to the MCV 104 to reduce the distance between the MCV 104 an the EV 102. The charge monitoring system 120 and/or the charge monitoring system 122 determines whether the MCV 104 is within the second target distance (e.g., by detecting the relative locations of the EV 102 and the MCV 104 from the GPS receivers 124, 126, the alignment sensor 322, etc.). Once the MCV 104 is within the second target distance, the arm 118 may be deployed to engage the second charge interface 112 with the first charge interface 110 and energy can be transferred from the MCV 104 to the EV 102. In some examples, switching the EV 102 to the autonomous driving mode before moving the MCV 104 closer to the EV 102 (where the arm 118 is deployed) increases the safety of the process. In other examples, more than two target distances may be employed.

As the EV 102 drives, the MCV 104 is synchronized to drive with the EV 102 (e.g., via adaptive cruise or another autonomous control). In some examples, the MCV 104 includes one or more sensors that automatically detect a position of the EV 102 and adjusts the speed, direction, etc. of the MCV 104 to stay within the target distance. In some examples, driving information is communicated to the MCV 104 so that the MCV 104 can synchronize its driving. In the illustrated example, the EV 102 includes a communication system 134 and the MCV 104 includes a communication system 136. The communication systems 134, 136 may be, for example, dedicated short range communications (DSRC). DSRC is a two-way short-to-medium wireless communication capability that permits a high rate of data transmission. In other examples, the communication systems 134, 136 may employ Bluetooth, radio, and/or any other vehicle-to-vehicle (V2V) communication device(s). The driving information (e.g., speed, steering, anticipated braking, etc.) is transmitted from the EV 102 to the MCV 104. The autonomous driving system 128 of the MCV 104 uses the driving information to adjust its speed, steering, etc. to stay within the target distance.

In other examples, the EV 102 is not autonomously driven, and the driver of the EV 102 continues to control the EV 102 while in the deployment and/or charge modes. In such an example, the EV 102 includes a driving detection system 138. The driving detection system 138 receives inputs from the steering column, the position of the brake pedal, the position of the gas pedal, the speedometer, etc. The driving information is similarly transmitted to the MCV 104 so that the MCV 104 can adjust its speed, steering, etc. to remain within the target distance.

After the charging is completed, the system 100 operates in a detachment mode. In some examples, the charge monitoring system 120 determines when the battery 106 is charged and requests (e.g., using the communications system 134) a disengagement. The charge monitoring system 122 uses the arm controller 130 to disengage the second charge interface 112 from the first charge interface 110. The EV 102 continues to its desired location, and the MCV 104 may then be redirected to a new destination (e.g., back to a charging station). In some examples, the EV 102 and/or the MCV 104 are switched back to manual mode. As can be seen, the EV 102 is not required to stop, slow down or alter its course during the charging process. As a result, the EV 102 can continue to its desired destination with minimal interference.

Figure 2:
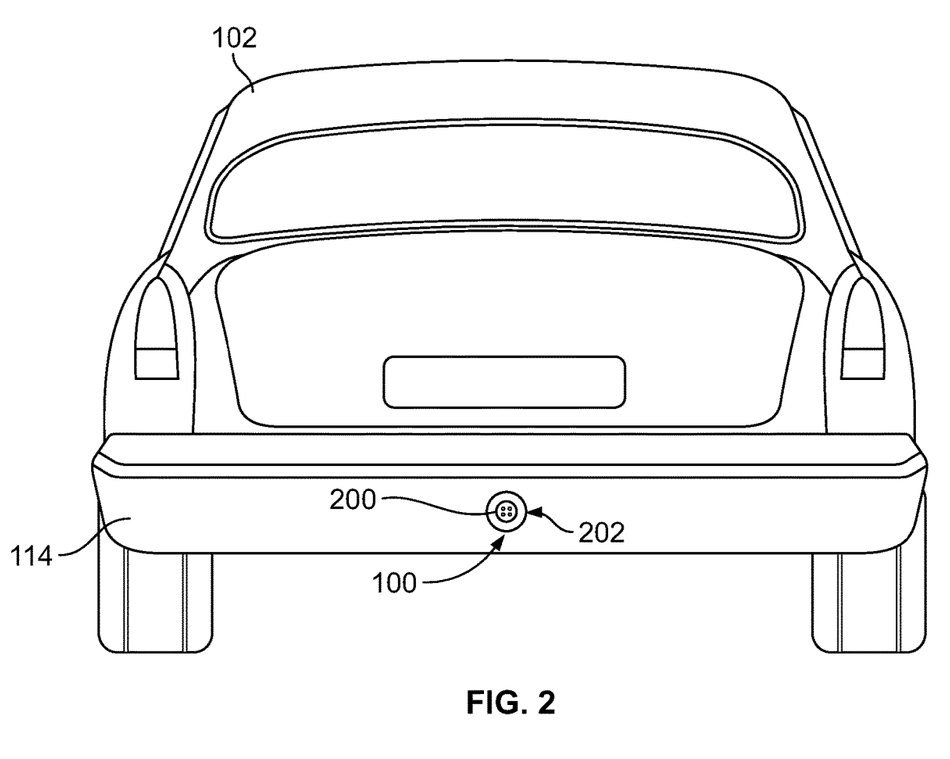
FIG. 2 is a rear view of the example electric vehicle of FIG. 1 showing an example female connector for a direct connection interface.

In some examples, energy is transferred via a direct or physical connection between the first charge interface 110 and the second charge interface 112. FIG. 2 illustrates the rear 114 of the EV 102 showing the first charge interface 110. In the illustrated example, the first charge interface 110 is implemented as a female socket connector 200 (e.g., a female connector). The first charge interface 110 is mounted in a recess 202 (e.g., a nozzle) formed in the rear 114 of the EV 102 (e.g., formed in an exterior surface of the EV 102). In the illustrated example, the recess 202 is conical, which aids in aligning or docking the second charge interface 112 with the first charge interface 110. In other examples, the recess 202 may be shaped differently. In some examples, the female socket connector 200 is not disposed in a recess (e.g., is flush or even with the rear 114 of the EV 102).

Figure 3:
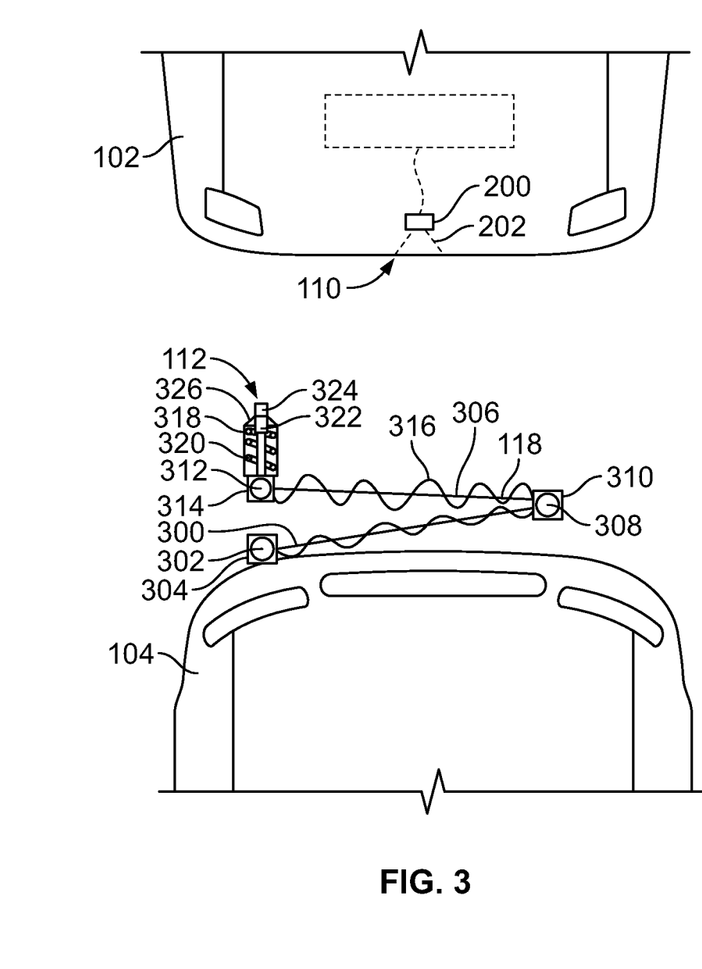
FIG. 3 is a top view of an example arm, in a retracted position, having an example male connector for mating with the example female connector of FIG. 2.
Figure 4:
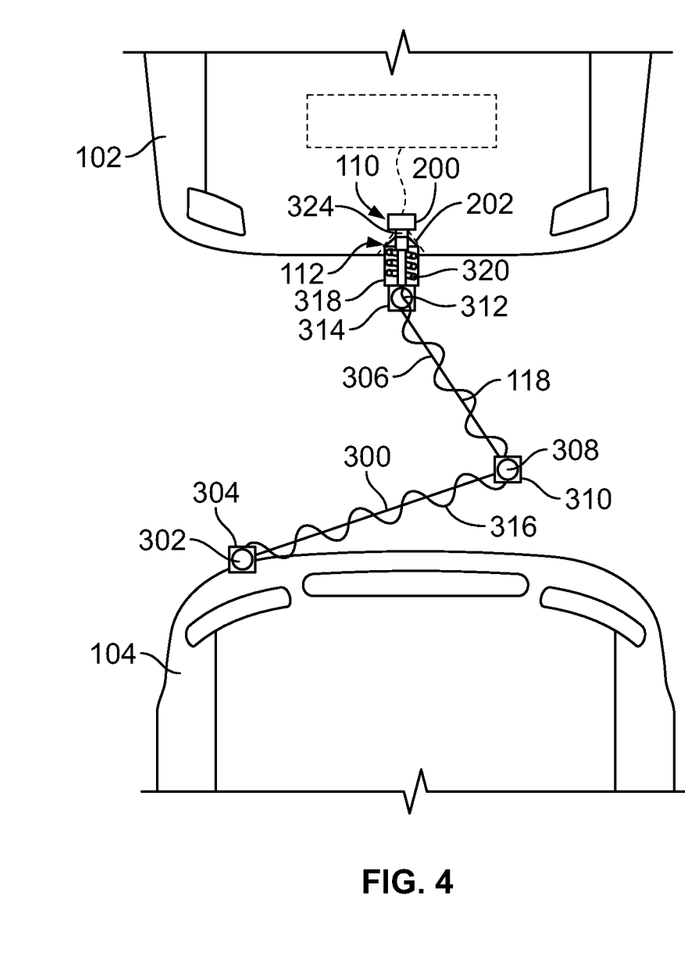
FIG. 4 is a top view of the example arm of FIG. 3 in a deployed or extend position in which the example male connector is engaged with the example female connector.

FIG. 3 is a top view showing the arm 118 in a retracted position and FIG. 4 is a top view showing the arm 118 in a deployed position. The arm 118 may be extended between the retracted position and the deployed position during the deployment mode, for example. In the illustrated example, the arm 118 includes a first arm portion 300 rotatably coupled to the front 116 of the MCV 104 at a first joint 302. The first arm portion 300 is rotatable about the first joint 302 via a first motor 304 (e.g., an actuator). The first motor 304 also moves the first arm portion 300 vertically, such that the arm 118 can be moved up and down as desired. In the illustrated example, a second arm portion 306 is rotatably coupled to an end of the first arm portion 300 at a second joint 308. The second arm portion 306 is rotatable about the second joint 308 via second motor 310. In the illustrated example, the second charge interface 112 is rotatably coupled to an end of the second arm portion 306 at a third joint 312. The second charge interface 112 is rotatable about the third joint 312 via a third motor 314. The arm controller 130 (FIG. 1) controls the first, second and third motors 304, 310, 314 to move the second charge interface 112 toward or away from the first charge interface 110. A charge cable or cord 316 extends from the MCV 104 to the second charge interface 112 and couples the battery 108 (FIG. 1) to the second charge interface 112.

To bias the second charge interface 112 toward the first charge interface 110 and maintain a relatively tight connection, the arm 118 includes a shock or strut 318 having a spring 320. The spring 320 acts to absorb bounces or disturbances. In the illustrated example, the strut 318 is coupled to the end of the second arm portion 306, and the second charge interface 112 is coupled to the strut 318 (i.e., the strut is coupled between the second charge interface 112 and the second arm portion 306). The spring 320 biases the second charge interface 112 outward (e.g., away from the front 116 of the MCV 104). In some examples, the arm 118 is controlled to apply a predetermined amount of force when engaging the second charge interface 112 with the first charge interface 110, which partially or fully compresses the spring 320, as illustrated in FIG. 4. As a result, if the EV 102 and/or the MCV 104 move apart from each other, toward each other, or otherwise experience small movements relative to each other (e.g., caused by bumps in the road) the spring 320 maintains a biasing force to maintain the second charge interface 112 in engagement with the first charge interface 110. In some examples, a latch or lock (e.g., with a limited locking force or release threshold) is provided to temporarily couple the second charge interface 112 to the first charge interface 110. In other examples, no lock or latch device is provided, so that if a significant departure is experienced, the second charge interface 112 can easily break away from the first charge interface 110, thereby minimizing the likelihood of damage.

In some examples, an alignment sensor 322 is employed to align the second charge interface 112 with the first charge interface 110. In the illustrated example, the alignment sensor 322 is carried on the end of the arm 118 adjacent the second charge interface 112. The alignment sensor 322 detects a position or location of the first charge interface 110 and communicates the relative position between the first charge interface 110 and the second charge interface 112 to the arm controller 130 (FIG. 1), which uses the information to control the arm 118 (e.g., via the first, second and/or third motors 304, 310, 314) to move the second charge interface 112 toward the first charge interface 110. The alignment sensor 322 may be one or more of a camera, a laser, radar, a sonic sensor (e.g., an ultrasound sensor) or a maser, for example. In other examples, other types of alignment sensors may be employed. For example, the alignment sensor 322 may include a GPS receiver. The alignment sensor 322 may align the second charge interface 112 based on the relative position between the location of the alignment sensor 322 and the location of the first charge interface 110. In some examples, in addition to or as an alternative to the driving information sent from the EV 102, the alignment sensor 322 communicates the relative position to the autonomous driving system 128 of the MCV 104 so that the MCV 104 can adjust its speed, direction, etc. to stay within the target distance.

In some examples, the alignment sensor 322 is coupled to another other location for detecting the relative positions of the first charge interface 110 and the second charge interface 112. For instance, in some examples, the alignment sensor 322 is mounted on the EV 102, and the alignment sensor 322 detects the position of the second charge interface 112 and communicates the position (e.g., via the communication system 130 (FIG. 1)) to the MCV 104. The arm controller 130 (FIG. 1) controls the arm 118 based on the position detected by the alignment sensor 322. In some examples, multiple alignment sensors (and/or receivers) are employed.

Depending on the location of the second charge interface 112 relative to the first charge interface 110, the arm 118 moves to engage the second charge interface 112 with the first charge interface 110. Additionally or alternatively, the speed and/or direction of the EV 102 and/or the MCV 104 may be controlled to adjust the relative position between the first charge interface 110 and the second charge interface 112. In the illustrated example, the second charge interface 112 is implemented as a male pin connector 324 (e.g., a male connector), and the first charge interface 110 is the female socket connector 200. As a result, the arm 118 is controlled to insert the male pin connector 324 into the female socket connector 200, as illustrated in FIG. 4. The conical shape of the recess 202 aids in aligning the second charge interface 112 (e.g., the male pin connector 324) with the first charge interface 110 (e.g., the female plug connector 200) as the second charge interface 112 approaches. In the illustrated example, the second charge interface 112 includes an angled or tapered surface 326. When the second charge interface 112 is moved towards the first charge interface 110, the tapered surface 326 engages the conical walls of the recess 202 to align the second charge interface 112 and the first charge interface 110.

In the illustrated example, the second charge interface 112 is implemented as the male pin connector 324 and the first charge interface 110 is implemented as the female socket connector 200. The male pin connector 324 may be a 2 pin connector, a 3 pin connector, a 4 pin connector, etc. In other examples, other types of direct connection connectors may be implemented, such as cylindrical connectors. In some examples, the second charge interface 112 is implemented as a female socket connector and the first charge interface 110 is implemented as a male pin connector.

Figure 5:
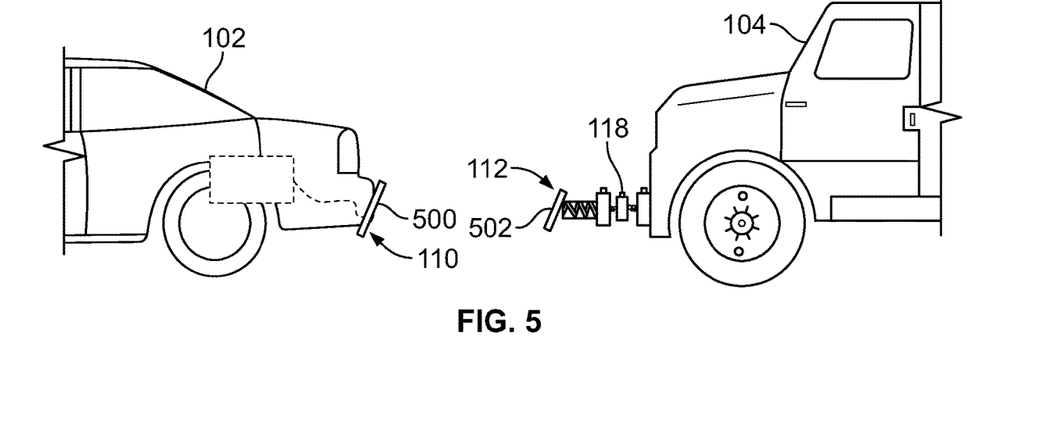
FIG. 5 is a side view of the example electric vehicle and the example mobile charge vehicle of FIG. 1 having example inductive plates for wireless charging.
Figure 6:
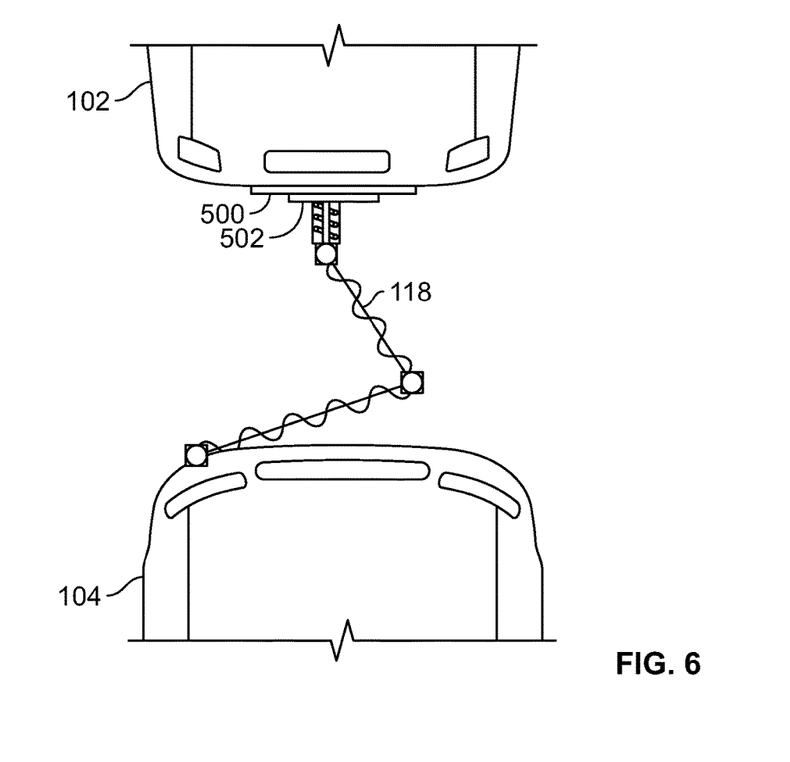
FIG. 6 is a top view of an example arm in a deployed position in which the example inductive plates of FIG. 5 are engaged.

FIGS. 5 and 6 illustrate another example charge interface that may be implemented to transfer energy from the MCV 104 to the EV 102. The example charge interface employs inductive charging (e.g., wireless charging). In the illustrated example, the first charge interface 110 includes an inductive receiver plate 500 (e.g., a first plate) and the second charge interface 112 includes an inductive transmitter plate 502 (e.g., a second plate). The inductive transmitter plate 502 includes a primary coil and the inductive receiver plate 500 includes a secondary coil. To transmit power, the inductive receiver plate 500 and the inductive transmitter plate 502 are positioned close to one another (e.g., without physical contact between the plates 500, 502) or in direct contact with each other. When the inductive receiver plate 500 and the inductive transmitter plate 502 are within a certain distance, electrical power may be transferred via inductive coupling.

In the illustrated example, the inductive receiver plate 500 has a larger surface area than the inductive transmitter plate 502. For example, the inductive receiver plate 500 may be 12 inches (")×8" and the inductive transmitter plate 502 may be 6"×4". The size difference enables the inductive transmitter plate 502 to move back-and-forth and/or side-to-side while still maintaining inductive coupling with the inductive receiver plate 500. In other examples, the plates 500, 502 may be other sizes. In other examples, the inductive transmitter plate 502 has a larger surface area than the inductive receiver plate 500.

In FIG. 6, the arm 118 is in the extended or deployed position. In some examples, the arm 118 is controlled to engage the inductive transmitter plate 502 with the inductive receiver plate 500. The plates 500, 502 can slide across one another while still maintaining wireless inductive connection. For example, if the distance or location between the EV 102 and the MCU 104 changes, the plates 500, 502 can slide relative to each other. This may be advantageous, for example, if the arm 118 does not include a spring or other biasing member. In other examples, the arm 118 is controlled to position the inductive transmitter plate 502 proximate or near the inductive receiver plate 500 (e.g., 2" away) without contacting the inductive receiver plate 500. In some examples, the inductive receiver plate 500 and/or the inductive transmitter plate 502 is covered by a material such as plastic that creates a small clearance between the inductive receiver plate 500 and the inductive transmitter plate 502, thereby providing protection for the plates 500, 502. The covering may also be more aesthetic (e.g., by hiding the metal plate of the inductive receiver plate 500 and/or the inductive transmitter plate 502).

In the illustrated example of FIGS. 5 and 6, the inductive receiver plate 500 is angled downward, toward the ground, and the inductive transmitter plate 502 is angled upward, away from the ground. As such, an even contact surface is formed between the inductive transmitter plate 502 and the inductive receiver plate 500. In other examples, the inductive transmitter plate 502 and the inductive receiver plate 500 may be angled differently (e.g., vertical, horizontal).

In the illustrated examples of FIGS. 1-6, the first charge interface 110 is on the rear 114 of the EV 102 and the second charge interface 112 is on the front 116 of the MCV 104. However, in other examples, the location of the first charge interface 110 and/or the second charge interface 112 may be different. For example, the first charge interface 110 may instead be on a front of the EV 102 and the second charger interface 112 may be on a rear of the MCV 104. In other examples, the first charge interface 110 may be on a side of the EV 102, and the second charge interface 112 may be on a side of the MCV 104.

While an example manner of implementing the system of 100 is illustrated in FIG. 1, one or more of the elements, processes and/or devices illustrated in FIG. 1 may be combined, divided, re-arranged, omitted, eliminated and/or implemented in any other way. Further, the example charge monitoring system 120, the example charge monitoring system 122, the example autonomous driving system 128, the example arm controller 130, the example autonomous driving system 132, the example communication system 134, the example communication system 136, the example driving detection system 138 and/or, more generally, the example system 100 of FIG. 1 may be implemented by hardware, software, firmware and/or any combination of hardware, software and/or firmware. Thus, for example, any of the example charge monitoring system 120, the example charge monitoring system 122, the example autonomous driving system 128, the example arm controller 130, the example autonomous driving system 132, the example communication system 134, the example communication system 136, the example driving detection system 138 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example charge monitoring system 120, the example charge monitoring system 122, the example autonomous driving system 128, the example arm controller 130, the example autonomous driving system 132, the example communication system 134, the example communication system 136 and/or the example driving detection system 138 is/are hereby expressly defined to include a tangible computer readable storage device or storage disk such as a memory, a digital versatile disk (DVD), a compact disk (CD), a Blu-ray disk, etc. storing the software and/or firmware. Further still, the example 100 of FIG. 1 may include one or more elements, processes and/or devices in addition to, or instead of, those illustrated in FIG. 1, and/or may include more than one of any or all of the illustrated elements, processes and devices.

Figure 7:
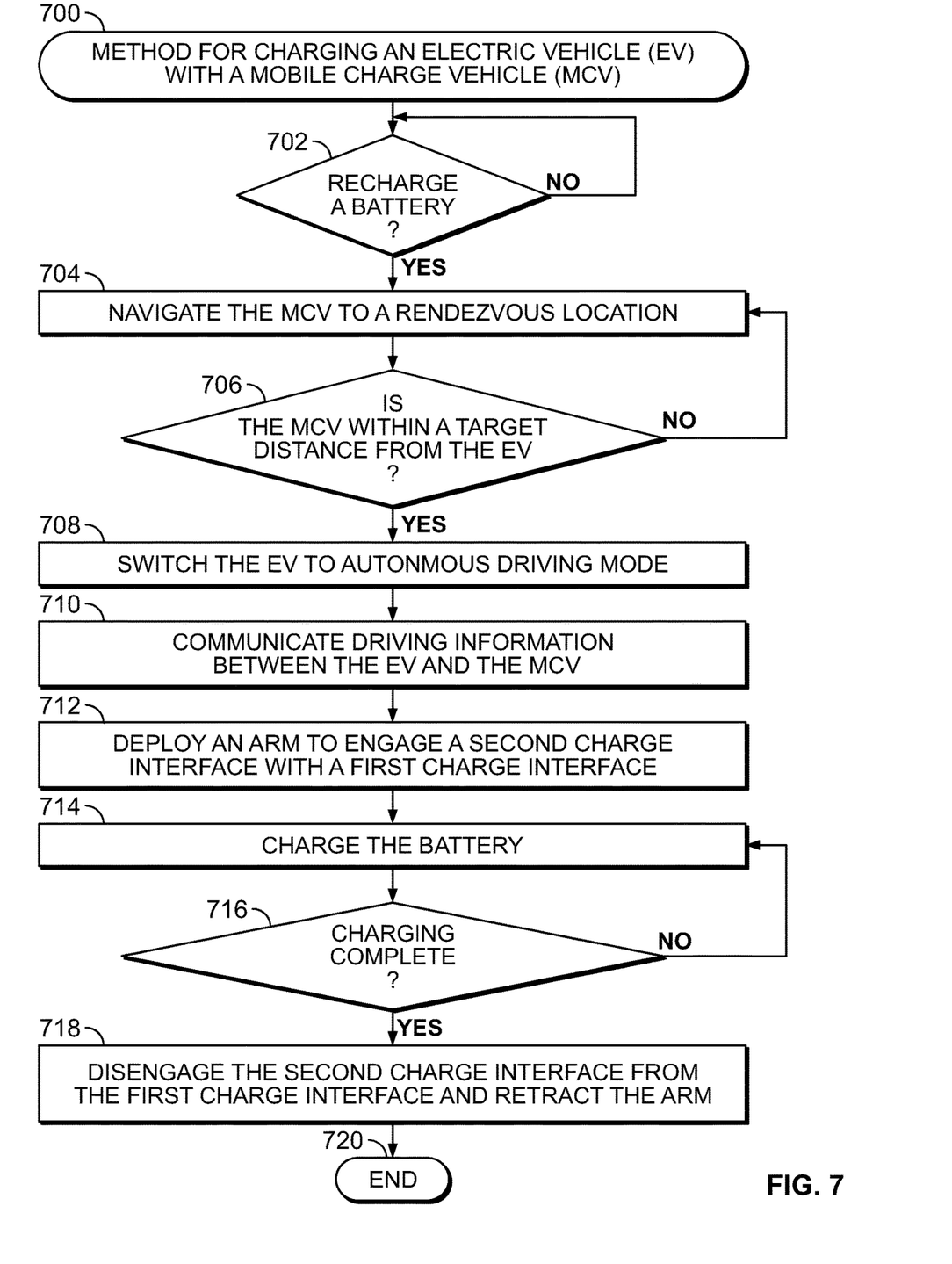
FIG. 7 is a flowchart representative of an example method of charging an electric vehicle with a mobile charge vehicle implemented with the example system of FIG. 1.

A flowchart representative of an example method 700 for implementing the charge monitoring system 120, the example charge monitoring system 122, the example autonomous driving system 128, the example arm controller 130, the example autonomous driving system 132, the example communication system 134, the example communication system 136, the example driving detection system 138 and/or, more generally, the example system 100 of FIG. 1 is shown in FIG. 7. In this example, the method 700 may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 7, many other methods of implementing the example system 100 may alternatively be used. For example, the order of execution of the blocks may be changed, and/or some of the blocks described may be changed, eliminated, or combined.

As mentioned above, the example method 700 of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method 700 of FIG. 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 700 is for charging an EV with an MCV. The example method 700 is disclosed in connection with the example system 100 of FIG. 1. However, in other examples, other systems may be employed to perform the example method 700.

At block 702, the charge monitoring system 120 of the EV 102 determines if the battery 106 requires a charge. In some examples, the charge monitoring system 120 automatically requests a charge when the battery 106 reaches a threshold (e.g., 10% capacity). Additionally or alternatively, in some examples, a charge is manually requested by a driver of the EV 102 and/or or another operator. The EV 102 sends a request to an MCV, such as the MCV 104, to receive a charge from the MCV 104. If no charge is requested, the example method 700 continues to monitor the charge of the battery 106.

Once a request is sent from the EV 102 to receive a charge from the MCV 104, the MCV 104 is navigated to a rendezvous location (block 704). As disclosed herein, the charge monitoring system 122 of the MCV 104 may switch to a rendezvous mode in which the MCV 104 is navigated to rendezvous location.

At block 706, the charge monitoring system 120 and/or the charge monitoring system 122 determines if the MCV 104 is within a target distance from the EV 102. The target distance may be a range (e.g., 2'-6' behind the EV 102 and 3' to either side of a center for the rear 114 of the EV 102), for example. In some examples, the charge monitoring system 120 and/or the charge monitoring system 122 determine whether the MCV 104 is within the target distance based on input from the GPS receivers 124, 126 and/or alignment information from the alignment sensor 322 (FIG. 3). If the MCV 104 is not within the target distance from the EV 102, the MCV 104 continues to travel towards to the rendezvous location (block 704) until the MCV 104 is within the target distance.

Once the MCV 104 is in the target distance, the EV 102 and/or the MCV 104 may operate in a deployment mode. At block 708, the EV 102 and/or the MCV 104 switches to autonomous driving mode. For example, the charge monitoring system 120 of the EV 102 may switch the EV 102 into autonomous driving mode when the MCV 104 is detected as being within the target distance. As illustrated in FIG. 1, the autonomous driving system 128 drives the MCV 104 and the autonomous driving system 132 drives the EV 102. At block 710, driving information is communicated between the EV 102 and the MCV 104 using the communication systems 134, 136. The driving information may include the speed of the EV 102, the speed of the MCV 104, a direction of travel of the EV 102, a direction of travel of the MCV 104, anticipated braking of the EV 102, a road condition, a traffic condition, etc. In some examples, the MCV 104 receives the driving information and adjusts a speed, direction, etc. of the MCV 104 to synchronize the driving movements between the EV 102 and the MCV 104.

At block 712, the charge monitoring station 122 controls the arm 118 (via the arm controller 130) to move the second charge interface 112 toward the first charge interface 110 while the MCV 104 is in motion. In some examples, a direct connection charge interface is employed. For example, in FIGS. 2-4 the second charge interface 112 includes the male pin connector 324 and the first charge interface 110 on the EV 102 includes the female socket connector 200. In other examples, such as in FIGS. 5 and 6, a wireless charging interface may be implemented. In such an example, the arm 118 is controlled to engage the inductive transmitter plate 502 with the inductive receiver plate 502 or position the inductive transmitter plate 502 proximate or adjacent the inductive receiver plate 500 without physically contacting the inductive receiver plate 500.

In some examples, after switching the EV 102 to autonomous driving mode and prior to deploying the arm 118, the EV 102 may be controlled (via the autonomous driving system 132) to reduce a distance between the MCV 104 and the EV 102 to a second target distance, which is closer than the initial target distance. For example, the charge monitoring system 120 may detect when the MCV 104 is within a first target distance (e.g., 10'-30') from the EV 102 and switch the EV 102 into an autonomous driving mode. The charge monitoring system 120 may then control the EV 102 (via the autonomous driving system 132) to reduce a distance between the EV 102 and the MCV to a second target distance (e.g., 3'-6'). Once the MCV 104 is within the second target distance, the arm 118 may be deployed to engage the second charge interface 112 with the first charge interface 110 and energy can be transferred energy from the MCV 104 to the EV 102.

At block 714, the charge monitoring systems 120, 122 switch to a charge mode and the MCV 104 transfers energy from the battery 108 to the battery 106 of the EV 102 (e.g., the EV 102 receives energy from the MCV 104 to charge the battery 106). In some examples, the charging operation (block 714) lasts about 15 minutes. In other examples, the charging process may last longer or shorter. At block 716, the charge monitoring system 120 continues to monitor the charge level of the battery 106 while energy is received. If the charging is not complete, the MCV 104 continues to transfer energy to the battery 106 of the EV (block 714).

If the charge monitoring system 120 determines the charging is complete (e.g., when the battery 106 is at or near 100% capacity) (block 718), the arm 118 is retracted to disengage the second charge interface 112 from the first charge interface 110 and the example method 700 ends at block 720. In some examples, the EV 102 sends an instruction (e.g., via the communication system 134) to the MCV 104 to disengage when the charge level meets a threshold level. After the arm 118 is disengaged from the EV 102, the EV 102 continues to its desired destination, and the MCV 104 may be routed to a new destination. In some examples, after the MCV 104 has disengaged, the EV 102 switches back to a manual driving mode and the driver takes control of the EV 102.

Figure 8:
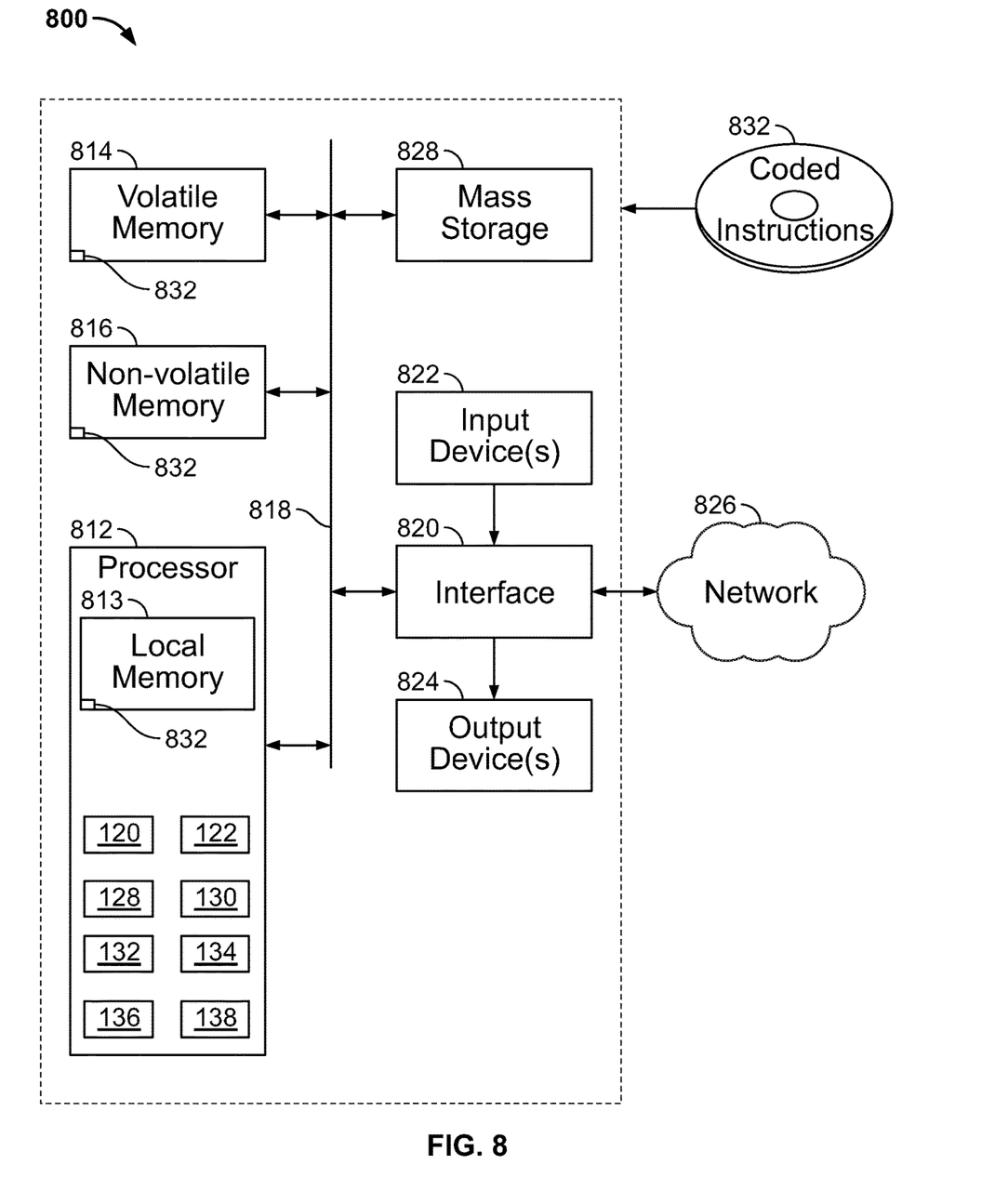
FIG. 8 is a block diagram of an example processor system structured to execute example machine readable instructions represented at least in part by FIG. 7 to implement the example system of FIG. 1.

FIG. 8 is a block diagram of an example processor platform 800 capable of executing instructions to implement the method 700 of FIG. 7 and the system 100 of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a Blu-ray player, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the method 700 of FIG. 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, systems/apparatus and articles of manufacture enable an EV to be charged while the EV is driving. The example methods, systems/apparatus and articles of manufacture create a less cumbersome charging process that enables an EV to be charged more often, relatively quickly, and with minimal interface to the EV. EVs can employ relatively smaller batteries having less capacity, thereby increasing the efficiency of the EV and decreasing the manufacturing costs. As a result, relatively cheaper EVs can be manufactured that are more competitively priced with gas vehicles.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electric vehicle comprising:
a battery; and
a first charge interface for the battery disposed on an exterior surface of the electric vehicle, the first charge interface configured to be engaged with a second charge interface on an articulating arm of a mobile charge vehicle to transfer energy from an energy source of the mobile charge vehicle to the battery while the electric vehicle is in motion,
wherein the first charge interface includes an inductive receiver plate to receive the energy from an inductive transmitter plate of the second charge interface, and
wherein the inductive receiver plate is angled downward.

2. The electric vehicle of claim 1, wherein the first charge interface includes a female connector to receive a male connector of the second charge interface.

3. The electric vehicle of claim 2 further including a conical recess formed in a rear of the electric vehicle, the female connector disposed in the conical recess.

4. The electric vehicle of claim 1 further including a charge monitoring system to switch the electric vehicle into an autonomous driving mode while the energy is transferred from the energy source to the battery.

5. The electric vehicle of claim 1 further including a communication system to transfer driving information to the mobile charge vehicle, the driving information including at least one of a speed of the electric vehicle, a direction of the electric vehicle, a road condition or a traffic condition.

6. A mobile charge vehicle for charging an electric vehicle having a battery and a first charge interface, the mobile charge vehicle comprising:
an energy supply;
an articulating arm;
a second charge interface coupled to an end of the articulating arm; and
a controller to move the articulating arm to engage the second charge interface with the first charge interface while the mobile charge vehicle is moving,
wherein the articulating arm includes:
a first arm portion rotatably coupled to a front of the mobile charge vehicle; and
a second arm portion rotatably coupled to an end of the first arm portion, the second charge interface rotatably coupled to the second arm portion.

7. The mobile charge vehicle of claim 6 further including a strut having a spring coupled between the second charge interface and the second arm portion to bias the second charge interface outward.

8. The mobile charge vehicle of claim 6, wherein the second charge interface includes an inductive transmitter plate to transfer energy to an inductive receiver plate of the first charge interface.

9. The mobile charge vehicle of claim 8, wherein a surface area of the inductive transmitter plate is smaller than a surface area of the inductive receiver plate.

10. The mobile charge vehicle of claim 8, wherein the controller is to control the articulating arm to position the inductive transmitter plate in contact with the inductive receiver plate.

11. The mobile charge vehicle of claim 8, wherein the controller is to control the articulating arm to position the inductive transmitter plate adjacent the inductive receiver plate without contacting the inductive receiver plate.

12. The mobile charge vehicle of claim 6 further including an alignment sensor carried by an end of the articulating arm to detect a location of the first charge interface.

13. The mobile charge vehicle of claim 12, wherein the alignment sensor includes at least one of a camera, a laser, an acoustic sensor or a maser.

14. An apparatus comprising:
a first vehicle having a first charge interface disposed in a recess formed in an exterior surface of the first vehicle; and
a second vehicle having an articulating arm, a second charge interface carried on an end of the articulating arm, the articulating arm to extend the second charge interface to engage the first charge interface while the first and second vehicles are moving,
wherein the recess is conical, and the second charge interface includes a tapered surface to engage the recess when the second charge interface moves towards the first charge interface.

15. The apparatus of claim 14, wherein the articulating arm is disposed on a front of the second vehicle.

16. The apparatus of claim 14, wherein the articulating arm includes a strut having a spring, the second charge interface carried by the strut, the spring to bias the second charge interface toward the first charge interface when the second charge interface is engaged with the first charge interface.

17. An apparatus comprising:
a first vehicle having a first charge interface disposed in a recess formed in an exterior surface of the first vehicle; and
a second vehicle having an articulating arm, a second charge interface carried on an end of the articulating arm, the articulating arm to extend the second charge interface to engage the first charge interface while the first and second vehicles are moving,
wherein the articulating arm includes a strut having a spring, the second charge interface carried by the strut, the spring to bias the second charge interface toward the first charge interface when the second charge interface is engaged with the first charge interface.

* * * * *